US012742535B2

(12) United States Patent
Falero et al.

(10) Patent No.: US 12,742,535 B2
(45) Date of Patent: Sep. 22, 2026

(54) AUTOMOTIVE MODULES AND METHODS FOR CONTROLLING THEREOF

(71) Applicant: ams-OSRAM International GmbH, Regensburg (DE)

(72) Inventors: Stefano Falero, New Rochelle, NY (US); Michael Godwin, Oxford, MI (US); Joseph Gasiewicz, Commerce, MI (US)

(73) Assignee: AMS-OSRAM INTERNATIONAL GMBH, Regensburg (DE)

(*) Notice: Subject to any disclaimer, the term of this patent is extended or adjusted under 35 U.S.C. 154(b) by 290 days.

(21) Appl. No.: 18/482,110

(22) Filed: Oct. 6, 2023

(65) Prior Publication Data

US 2025/0116387 A1 Apr. 10, 2025

(51) Int. Cl.

| | |
|---|---|
| ***F21S 45/48*** | (2018.01) |
| ***F21S 41/153*** | (2018.01) |
| ***F21S 41/16*** | (2018.01) |
| ***F21S 41/25*** | (2018.01) |
| ***F21S 41/29*** | (2018.01) |
| ***H05B 45/325*** | (2020.01) |

(52) U.S. Cl.

CPC ............. *F21S 45/48* (2018.01); *F21S 41/153* (2018.01); *F21S 41/16* (2018.01); *F21S 41/25* (2018.01); *F21S 41/295* (2018.01); *H05B 45/325* (2020.01)

(58) Field of Classification Search

CPC ....................... F21W 2103/60; B60Q 2400/50

See application file for complete search history.

(56) References Cited

U.S. PATENT DOCUMENTS

| | | | | |
|---|---|---|---|---|
| 10,337,690 | B2 | 7/2019 | Tessnow et al. | |
| 10,509,147 | B2 | 12/2019 | Rossi et al. | |
| 2009/0052182 | A1* | 2/2009 | Matsuba | F21V 13/02 362/268 |

(Continued)

FOREIGN PATENT DOCUMENTS

| | | | | |
|---|---|---|---|---|
| DE | 102018220295 A1 * | 5/2020 | | B60Q 1/323 |
| DE | 202018006805 U1 | 1/2023 | | |

(Continued)

OTHER PUBLICATIONS

International Search Report of corresponding International Application No. PCT/EP2024/076760, dated Dec. 18, 2024, 4 pages (for informational purposes only).

*Primary Examiner* — Alexander P Gross

(74) *Attorney, Agent, or Firm* — Viering, Jentschura & Partner mbB

(57) ABSTRACT

An automotive apparatus includes a heatsink; a lighting module coupled to the heat sink, the lighting module comprising one or more light sources, a light source driver for driving the one or more light sources; at least one microlens array comprising a plurality of microlenses comprising a plurality of sections, wherein each microlens array section is configured to project an image using light from the one or more light sources; a collimating assembly arranged between the lighting module and the at least one microlens array comprising: one or more collimators corresponding respectively to the one or more light sources, wherein each of the one or more collimators is aligned in a light path from a corresponding one of the one or more light source and the at least one microlens array.

20 Claims, 11 Drawing Sheets

(56) References Cited

U.S. PATENT DOCUMENTS

| | | | | |
|---|---|---|---|---|
| 2019/0270403 | A1* | 9/2019 | Sobecki | G03B 21/2033 |
| 2019/0315270 | A1* | 10/2019 | Ly | H05B 47/11 |
| 2023/0047462 | A1 | 2/2023 | Bushre et al. | |
| 2023/0129730 | A1 | 4/2023 | Bremer et al. | |

FOREIGN PATENT DOCUMENTS

| | | | | |
|---|---|---|---|---|
| EP | 3540294 | A1 * | 9/2019 | F21S 41/141 |
| KR | 20210043097 | A | 4/2021 | |

* cited by examiner

AUTOMOTIVE MODULES AND METHODS FOR CONTROLLING THEREOF

FIELD

This present disclosure generally relates to automotive modules.

BACKGROUND

Previous light-emitting modules for vehicles and automobiles include light-emitting diode (LED) modules include heat sinks and have designs centering on heat-removal from the LEDs on the heat module or directing heat flow onto headlight optics to defog and/or deice.

However, previous light-emitting or LED modules do not allow scalable methods of aligning LEDs with imaging optics.

DESCRIPTION

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

Figure 1A:
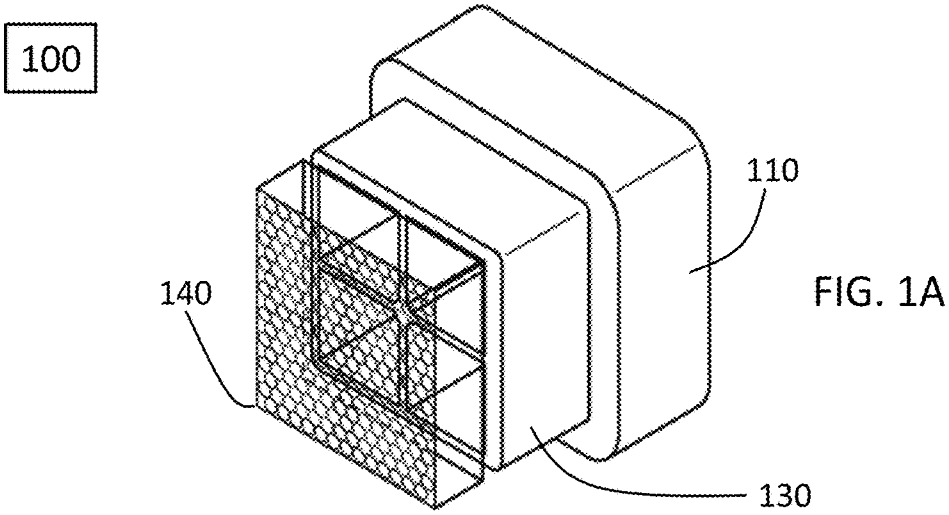
FIGS. 1A to 1D illustrates at least one example of automotive lighting apparatus according to aspects of the present disclosure.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures. Throughout the drawings, it should be noted that proportions are not necessary to scale and that the size of features may be emphasized for ease of illustration.

FIGS. 1A to 1D show different views of an automotive lighting apparatus 100 according to at least one aspect of the present disclosure.

The automotive lighting apparatus 100 can include a heat sink 110, a lighting module 120, a collimating assembly 130, and one or more microlens arrays 140. In these views, the lighting module 120 is not shown. An example of a lighting module 120 is shown in FIGS. 2A and 2B.

Figure 1B:
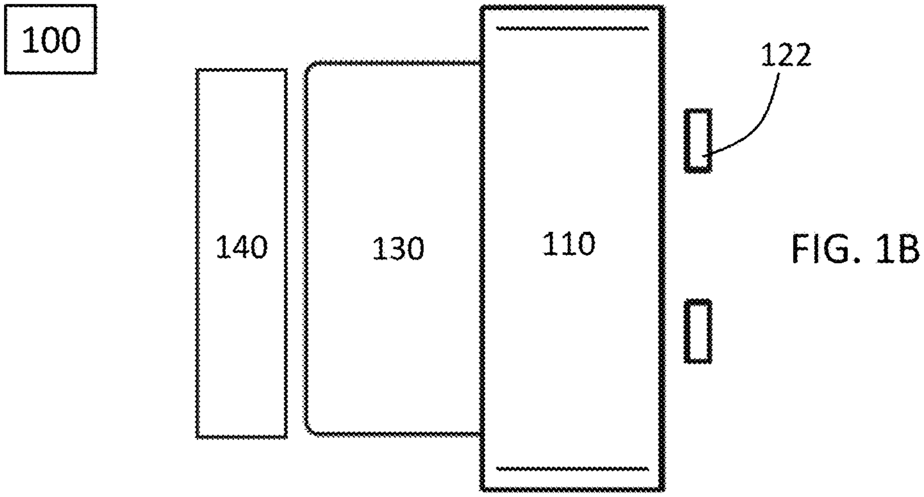
Figure 1C:
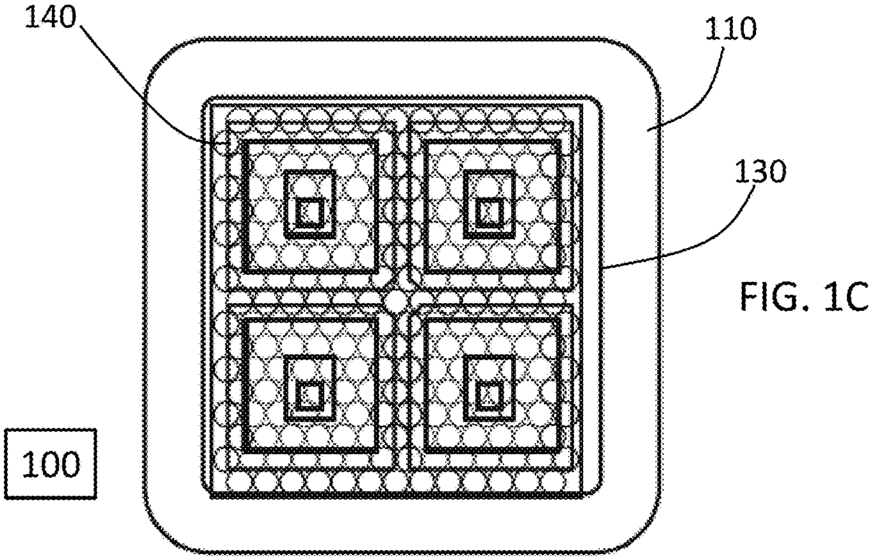
Figure 1D:
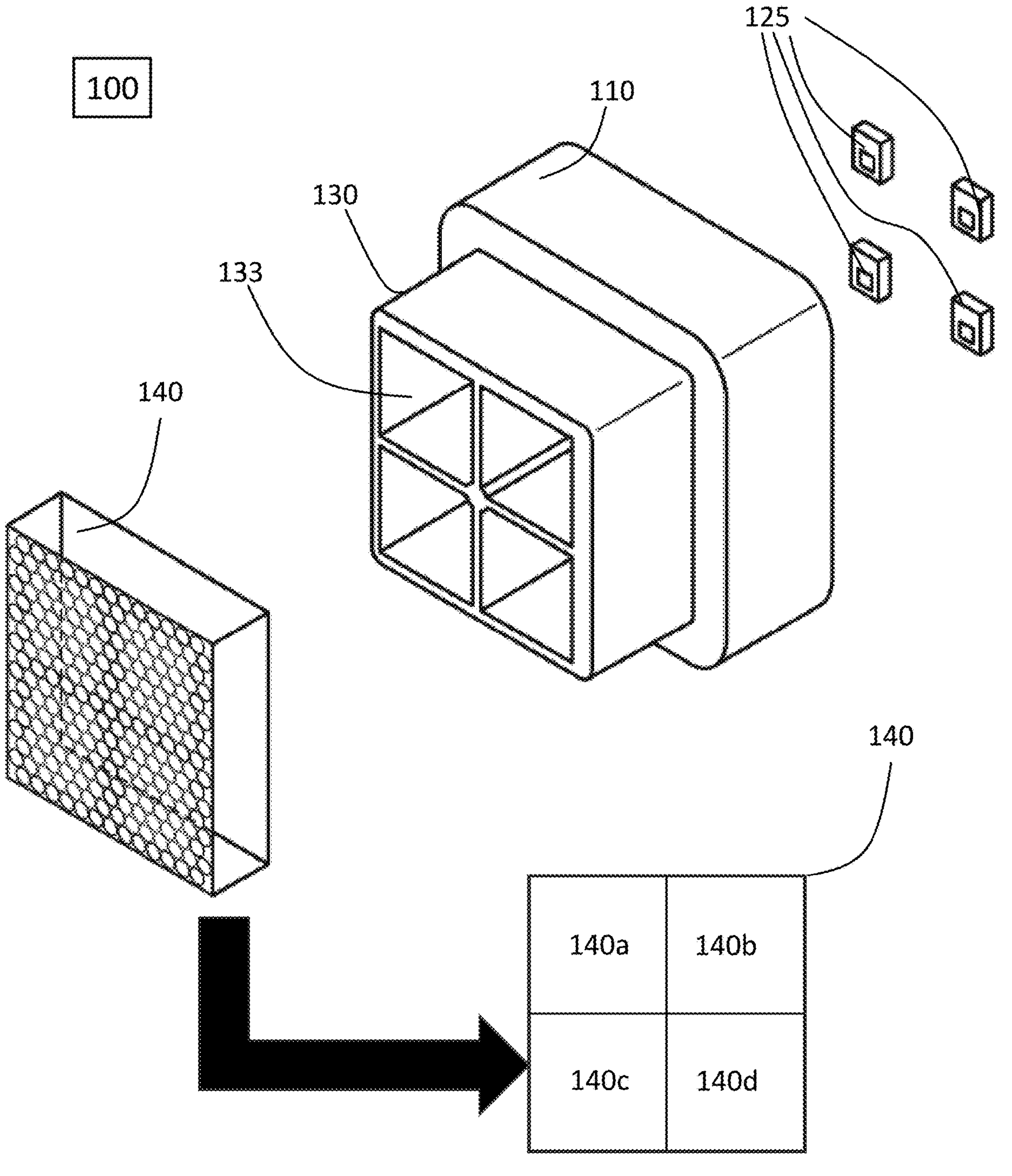

FIG. 1A shows a perspective view of the automotive lighting apparatus 100. FIG. 1B shows a semi-exploded side plan view of the lighting apparatus 100 in which the light sources 125 and the microlens array 140 are shown separated from the heat sink 110 and the collimating assembly 130. FIG. 1C shows a top plan view of the automotive lighting apparatus 100. FIG. 1D show an exploded perspective view of the automotive lighting apparatus 100.

As shown in FIGS. 1A-1D, the automotive lighting apparatus 100 may be arranged so that heat sink couples to the lighting module 120. The lighting module, for example, may reside within at least a portion of the heat sink. Further, the heat sink 110 and/or lighting module 120 can couple to the collimating assembly 130. The collimating assembly 130 can include one or more spaces or receptacles 133 for housing collimators (not shown). The collimating assembly 130 and the light sources 125 can be arranged within the automotive lighting apparatus so that collimators are aligned with the light sources, and further aligned with thee microlens array 140.

Figure 2A:
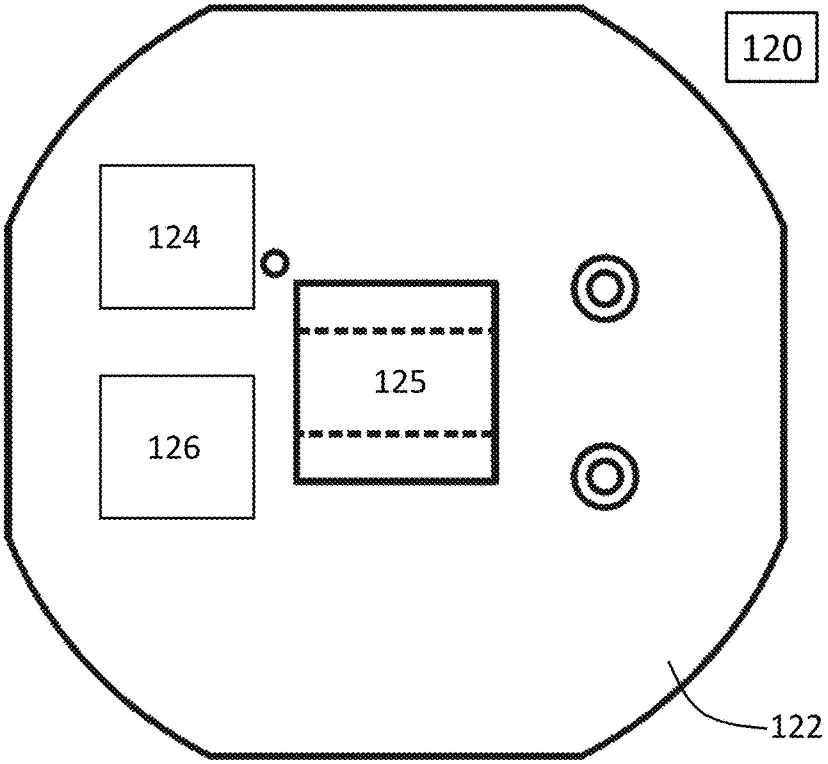
FIGS. 2A to 2B illustrates at least example of a lighting module according to aspects of the present disclosure.
Figure 2B:
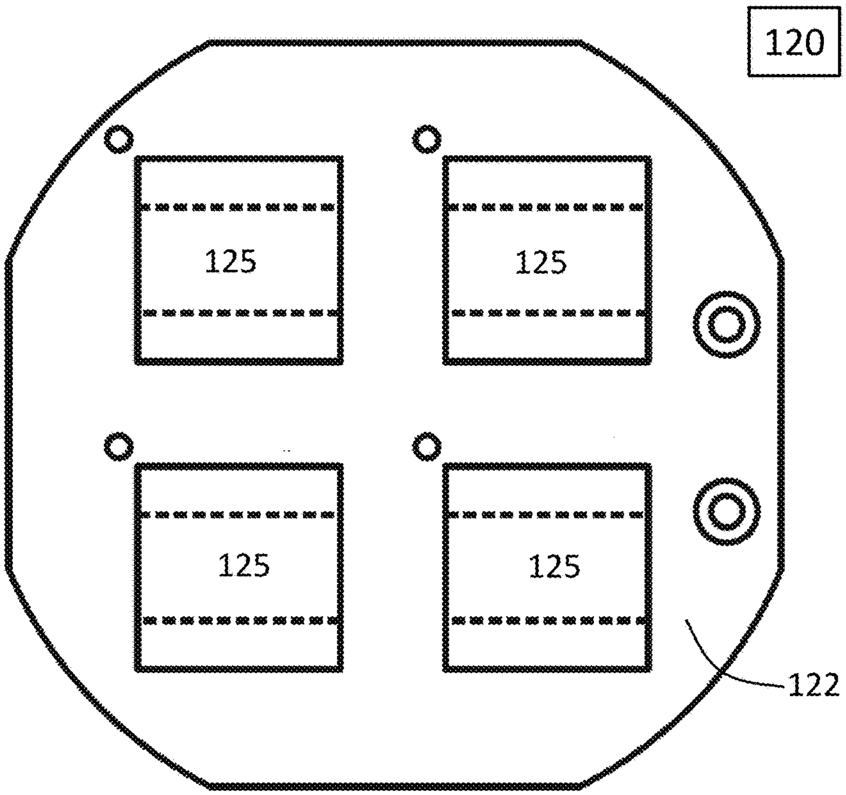

As shown in FIG. 2A and 2B, the lighting module 120 can include a circuit board 122. The lighting apparatus 100 can include one or more light sources 125 which are mounted on the circuit board, e.g., a printed circuit board. For example, the board 122 of FIG. 2A includes a single light source 125, but the board 122 of FIG. 2B includes multiple light sources 125.

In addition to the light sources 125, other elements, components, modules, or circuitries may be included and mounted on the circuit board 125.

In the example of FIG. 2A, a single light source 125 is mounted on the board along with a light source driver circuitry 124 and one or more controllers or processors 126. For example, the controllers or processors 126 can include a light source controller that can control the operation or behavior of the light sources 125. That is, light source controllers described herein can control how, when, and in what manner the light source emits. For example, the light source controller can apply and use pulse width modulation to control the light emission of a light source, e.g., control the duty cycle of control signal using pulse width modulation to affect the brightness of the light sources.

The light sources described in the automotive lighting apparatus herein may be individually addressable. While a controller can be included in the lighting module or automotive lighting apparatus to control operation of the light sources, in other examples, control or communications can be external to the lighting module and automotive lighting apparatus. That is the light sources may be in communication with an external control source, e.g., a controller external to the automotive lighting apparatus. The external controller can send signals to control the light sources as described herein.

The light sources 125 and others described herein may be any suitable type light sources including light-emitting diodes (LEDs), lasers, VCSELs, etc.

While FIG. 2A, shows components mounted on one side, e.g. a first side of the circuit board 122, this is not necessarily required. In other cases, components such as the light source driver circuitry 124, the one or more processors 126, etc. can be mounted on a second side, e.g., a side opposite to the side of the board 122 on which the light source(s) 125 are mounted. The light source driver or light source driver circuitry can be configured to drive the one or more light sources 125.

Figure 3:
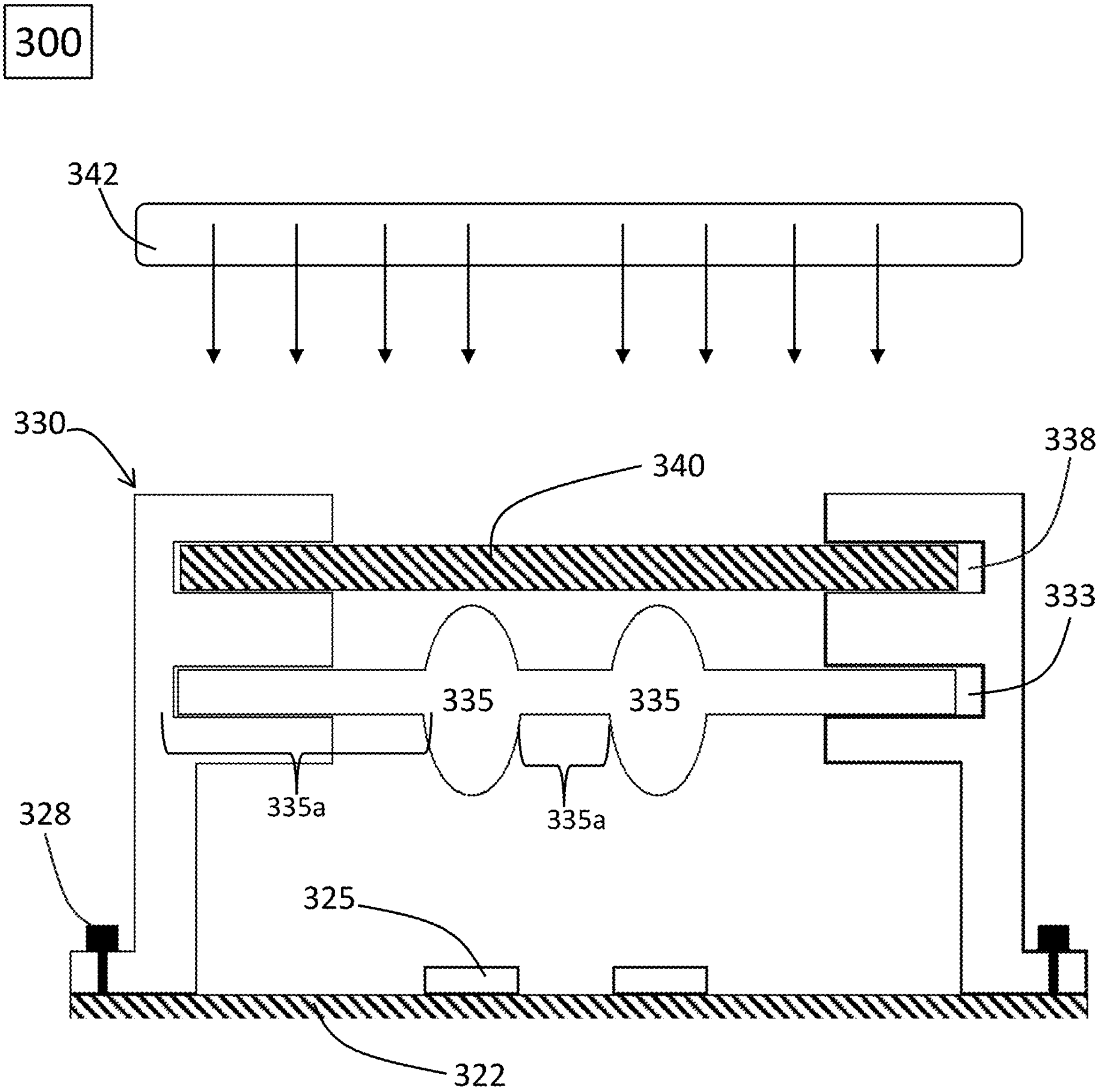
FIG. 3 illustrates aspects of an automotive lighting apparatus according to aspects of the present disclosure.

FIG. 3 shows a cross-section view of an aspect of an automotive lighting apparatus 300. (For simplicity, a heat sink is not shown.)

Similar to the examples of FIGS. 1A-1D, the automotive lighting apparatus 300 can include a circuit board 322, a collimating assembly 330, and a micro lens array 340. The light sources 325 are mounted on the circuit board 322.

The circuit board and light sources 325 can form part of a lighting module, such as the lighting module 120 of FIG. 2A. Other components, not shown, may also be mounted on the circuit board 322 such as controllers, processors, or drivers, as described herein.

In the example of FIG. 3A, the collimating assembly 330 can attach to the circuit board 322, such as through fastening means, e. g., screws, nails, etc. 328. The collimating assembly 330 includes a receptacle or slot 333 in which can hold the collimators 335 and the light sources 325.

The collimators 335 can narrow and/or direct light emitted from the light sources 325 to produce parallel rays of light. The collimating assembly 330 can arranged so that collimators are aligned and appropriately above the light sources 325.

In the example of FIG. 3, the collimators 335 may be included or attached to a structure 335*a* that can fit into the slot 333. The structure 335*a* may be in any suitable form that can be inserted or included in the collimating assembly 330 so that the collimators 335 are aligned with the light sources 325. In FIG. 3, the structure 335 is a plate-like structure or member that hold the collimators 335. Further, in this case, the structure 335*a* along with the collimators 335 can be side loaded into the slot 333 of the collimating assembly 330. Additionally, the collimating assembly 330 may include fastening mechanisms to further hold the collimators 335/structure 335*a* in the slot 333.

Further, the collimator assembly 330 can include a microlens array slot 338. The slot can be used to hold the microlens array as shown in FIG. 3. With the slot 338, the microlens array 340 can also be side loaded into the collimating assembly 330 via the slot 338. Additionally, the collimating assembly 330 may include fastening mechanisms to further hold the microlens array 340 in the slot 338.

As described, herein, fastening or securing mechanisms may include, without limitation, screws and bolts, nails, rivets, welding, adhesives, clips, clamps, hooks, velcro, hook and loop fasteners, magnetic fasteners, form fitting, etc.

Further, the lighting apparatus 300 of the FIG. 3B includes a cover 342. The cover 342 can be placed over the microlens array 340 and may attach through any suitable fastening mechanism to the collimating assembly. The cover 342 can be a protective and translucent cover. The cover 342 may help hold the microlens array 340 in place in collimating assembly 330.

Further, in FIG. 3, as well as in other automotive lighting apparatus examples described herein, the microlens array 140 may be removably attachable to the lighting apparatus. For instance, the microlens array 340 can be attachable and removable or detachable from the collimating assembly 330. For example, the mcirolens array 340 may be removed or side extracted from the slot 338.

In the automotive lighting apparatus examples described herein, the microlens arrays is configured to project an image using light it received from the light source. In particular, light from the light sources is collimated by the collimators and before reaching the microlens array.

For example, each light source of the automotive lighting apparatuses described herein may correspond respectively with one collimator or vice versa. Said differently, there may be a plurality of light sources and a plurality of collimators having a one-to-one correspondence. Further, each collimator can be aligned with the respective light source along a light path extending from the light source to one or more microlens arrays. Moreover, in the case where the microlens array includes multiple sections, each light source may correspond respectively to one collimator and to one microlens array section. That is the light sources can have a one to correspondence with collimator a one-to-one and correspondence with the microlens array sections.

Further, in the automotive lighting apparatus examples described herein, the microlens arrays may be sectioned. That is, each microlens array may have a plurality of sections. In one example, each section may project a same or different image compared to the other sections of the microlens array. FIG. 1D shows an example of the microlens array 140 have sections, namely sections 140*a*, 140*b*, 140*c*, and 140*d*.

In the automotive lighting apparatus examples described herein, the light sources may be controlled by a controller (internal or external). For example, a controller may be included in the lighting module in the automotive lighting apparatus. For example, in the context of the automotive lighting apparatus 100, the processor/controller 126 of FIG. 2 may control the light sources 125.

For the automotive lighting apparatuses described herein, a controller can be configured to control or cause the light source(s) to emit selectively in a variety of ways or manners, especially when there is a plurality of light sources. For example, a controller can be configured to cause light sources to selectively emit light to one or more of the microlens array sections.

In another example, a controller can be configured to cause a plurality of light sources to emit light at a same time to the at least one microlens array so as to form a single projected image, wherein each microlens array section projects an image that forms a part of the single projected image.

Figure 4A:
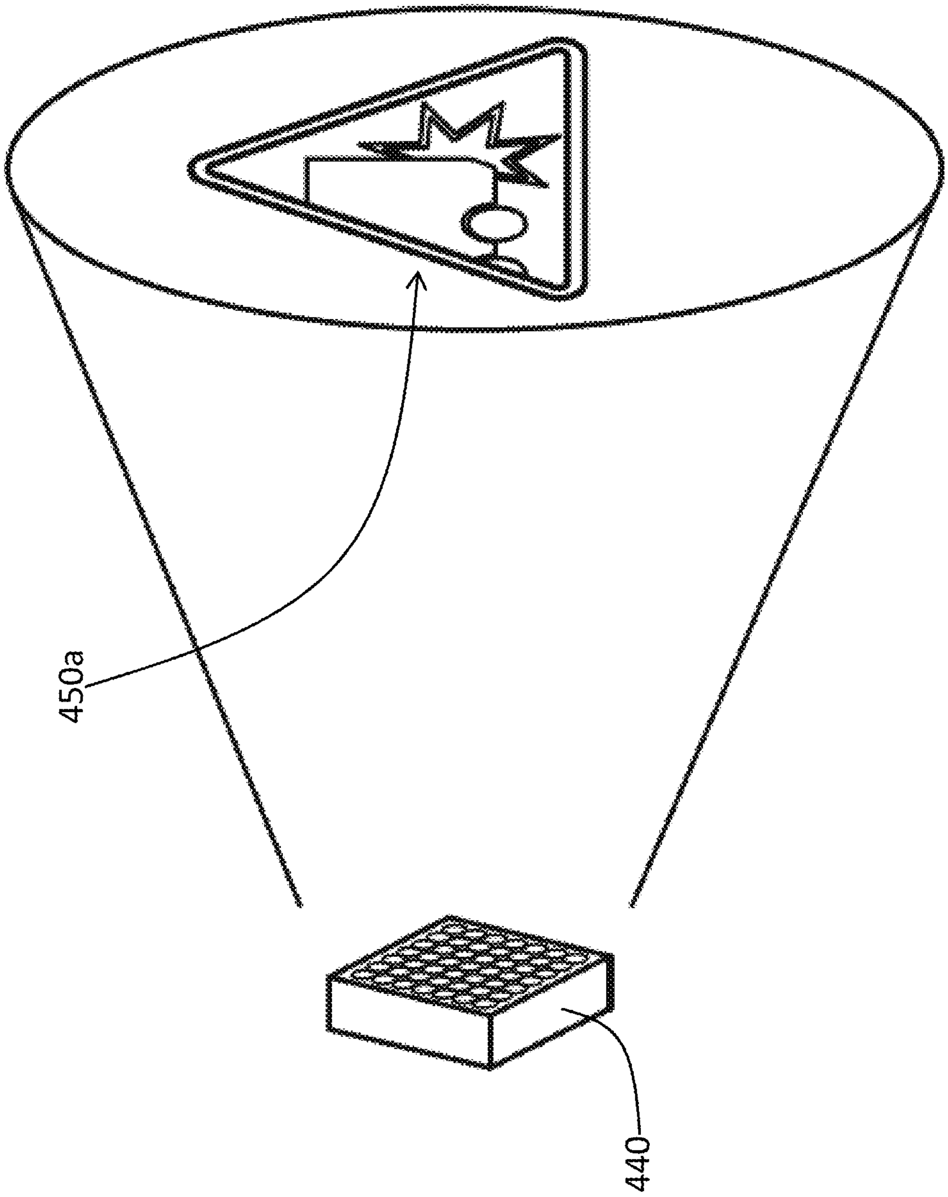
FIGS. 4A to 4E illustrates examples images projected from a microlens array according to aspects of the present disclosure.

For example, FIG. 4A shows one example of a projected image 450*a* formed from light output from a microlens array 440. The microlens array 440 may be of any automotive lighting apparatus described herein. The microlens array 440 be or composed of a single section or may have different sections that when illuminated by light from the light source(s) produce the projected image 450*a* shown. That is, the image 450*a* can be shown by all sections of the microlens array 440 being illuminated or receiving light together. That is, the controller causes one or more light sources to emit light to all of the microlens array sections at the same time.

Figure 4B:
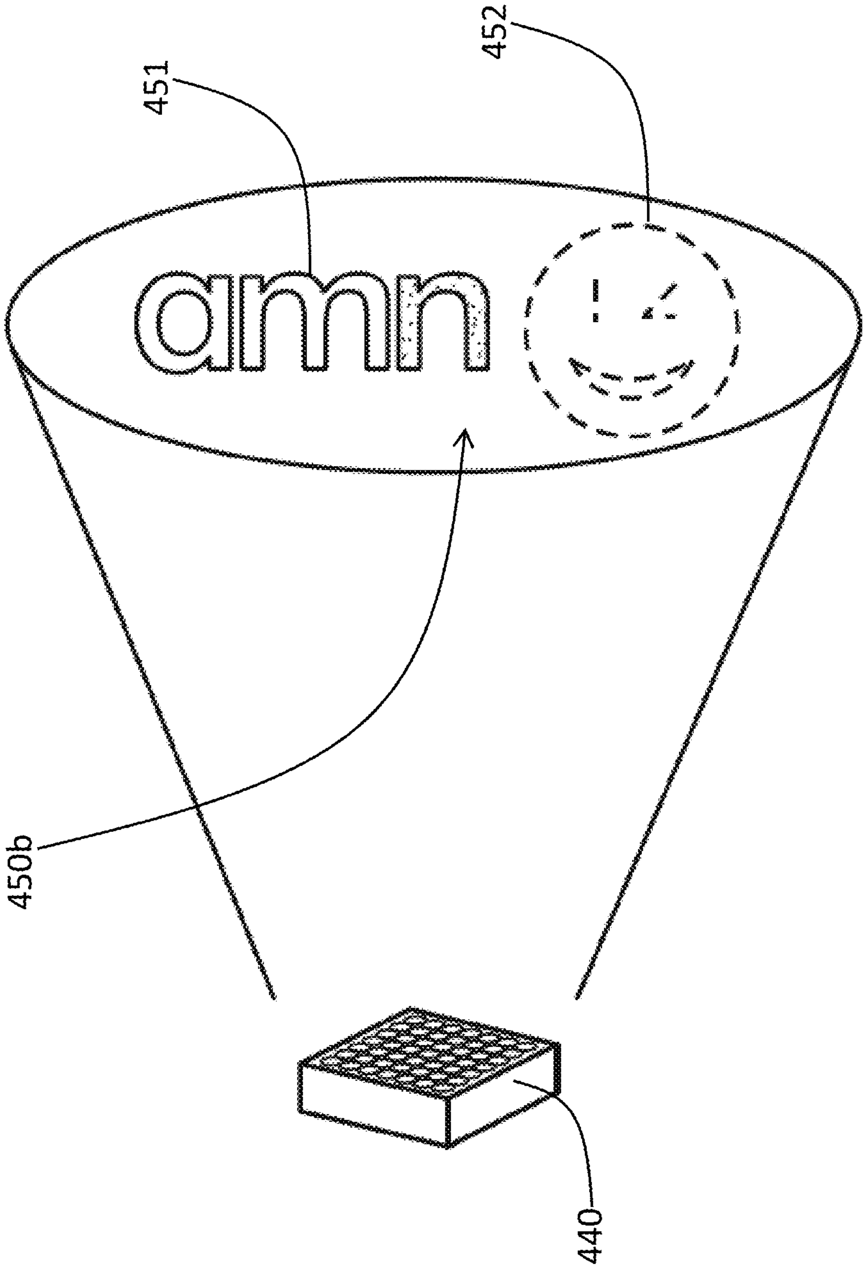

FIGS. 4B shows another example or projected image 450*b* formed from microlens array 450*a*. The projected image 450*b* may include sub-images or sub graphics, 451 and 452. In one case, the projected image may be formed by controller causing the one or more light sources to emit light at the same time, e.g., to all the one or more microlens array sections of the microlens array 440 which can cause both graphics 451 and 452 to be displayed together.

However, in other examples where there is a plurality of light sources, a controller can be configured to cause the plurality of light sources to respectively emit light at different times. Moreover, the controller can accomplish this in a manner so that the microlens array respectively projects a plurality of images at the different times. That is, each microlens array section may project one of the plurality of projected images at the different times.

Figure 4C:
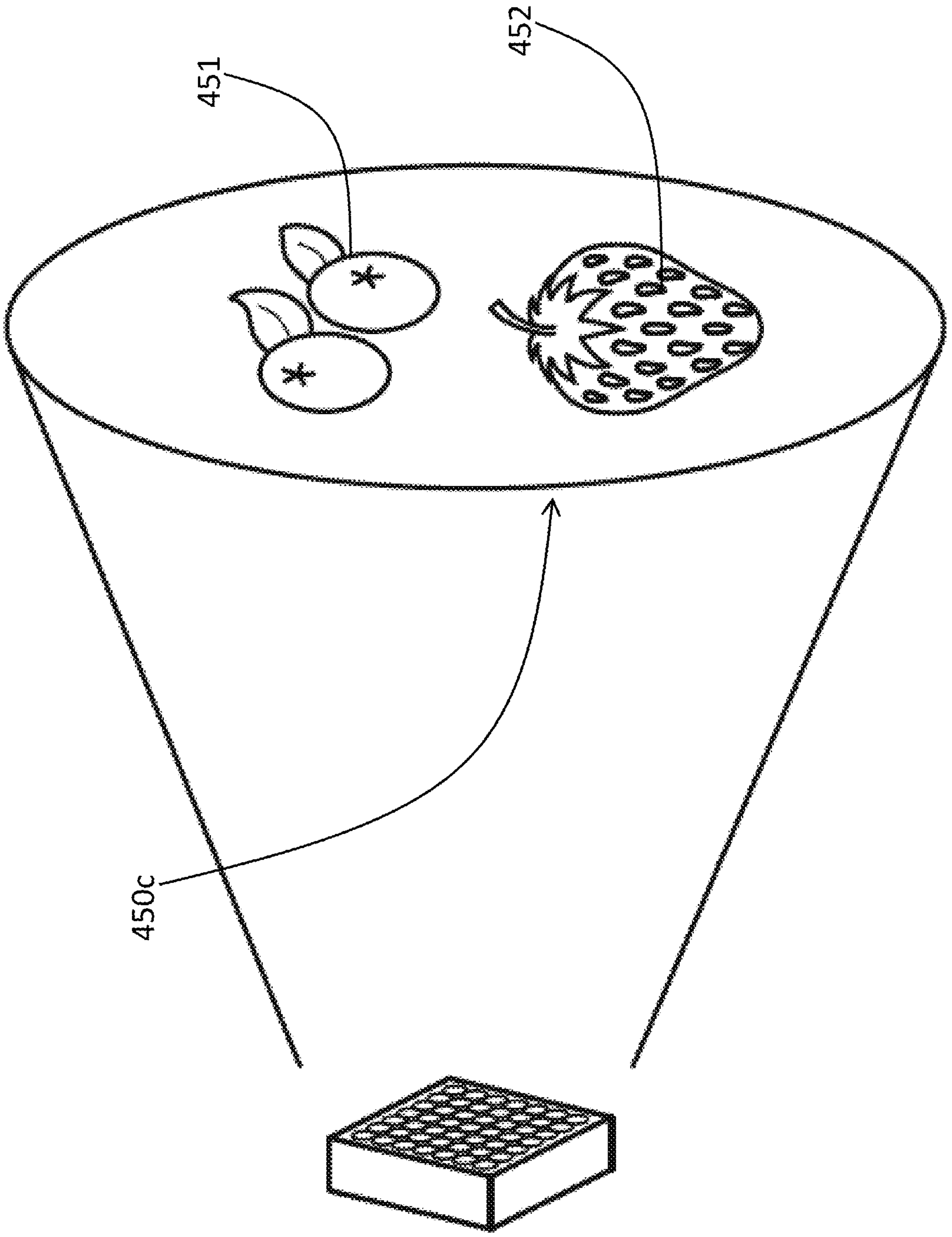
Figure 4D:
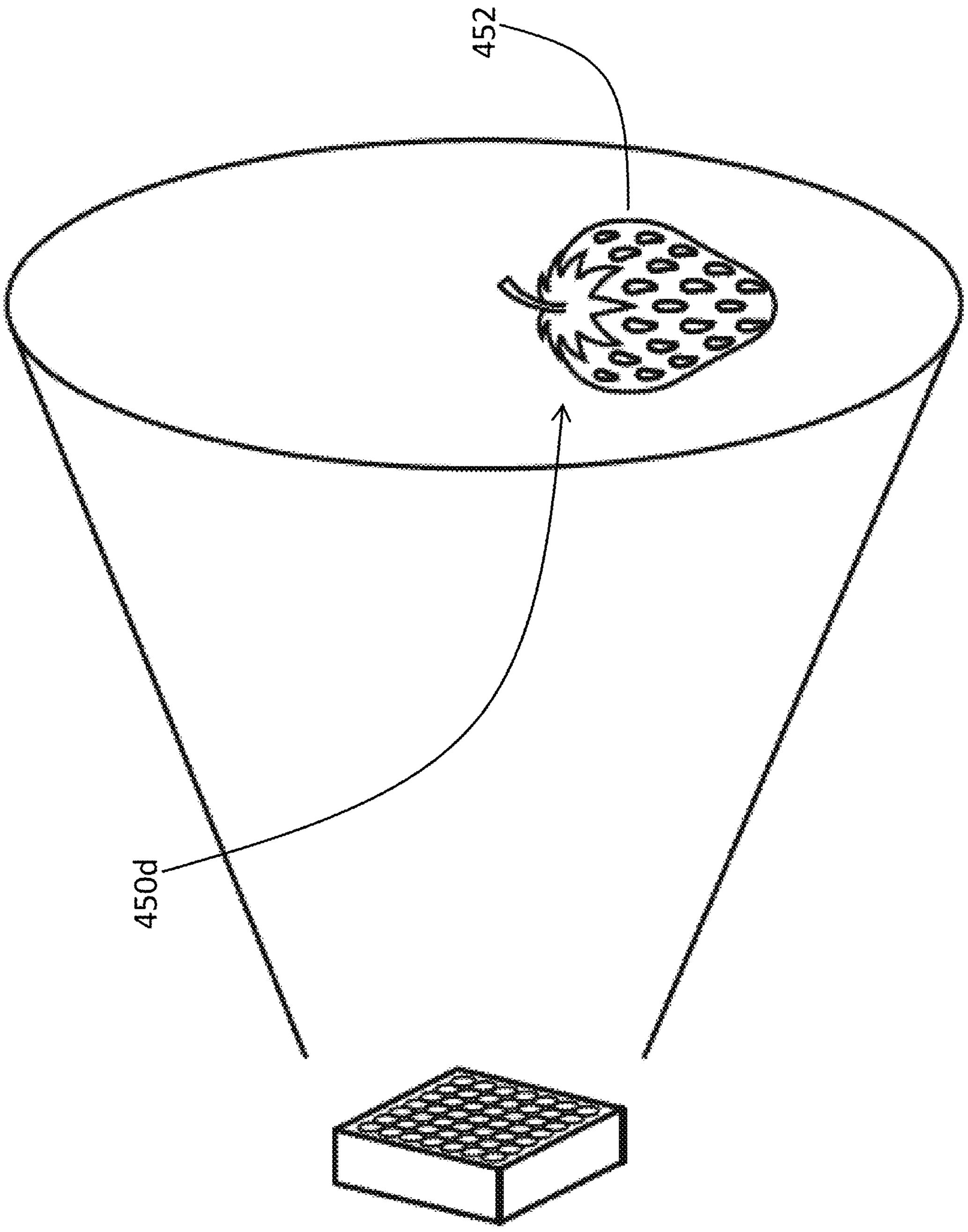
Figure 4E:
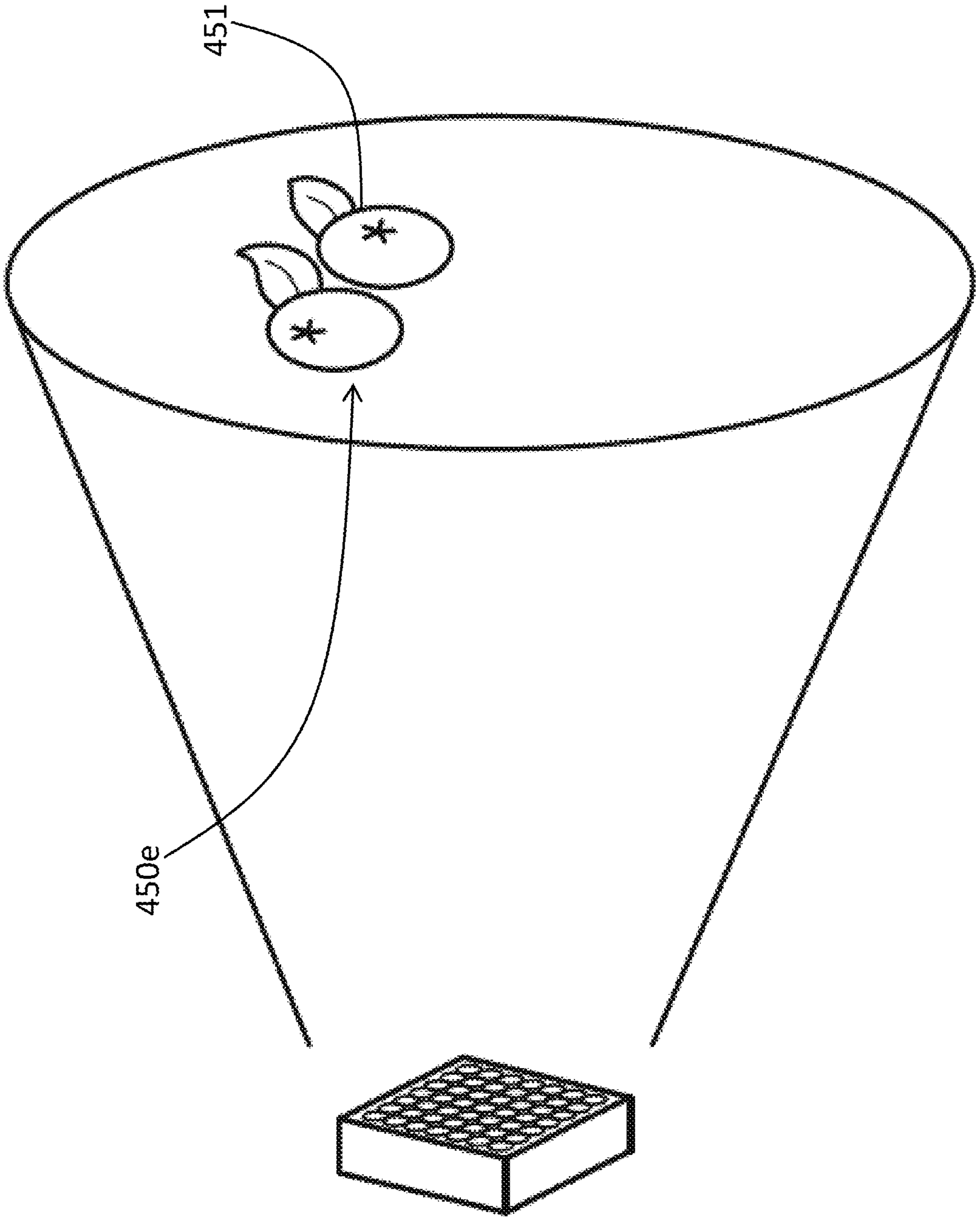

For example, referring to FIGS. 4C through 4E, it is possible that there are two sections to the microlens array 440. The two sections may be controlled or caused by a controller to emit at same or different times. In FIG. 4C, the graphics 451 are displayed together at the same time. The light source controller causes the light sources to emit light at the same time and thus causing the sections of the microlens array to project the graphics 451 and 452 at the same time. However, in FIG. 4D and FIG. 4E shows the projected output at different times. In FIG. 4D only the image 452 is projected whereas in FIG. 4E, only the image 451 is projected due to the light source controller.

Further, other possibilities for controlling the light sources to selectively emit light are possible. In another example, a controller can be configured to cause the one or more light sources to selectively emit light in a sequence so that projected image from the at least one microlens array is an animated projection. In such a case, each microlens array section can project an individual frame of the animated projection, e.g., in each sequence.

Other possibilities include a controller (e.g., external or controller) can be configured to cause the one or more light sources to selectively emit light in a sequence of variable brightness. For example, a controller can be configured to cause the one or more light source to selectively emit light using pulse-width modulation (PWM) signal to control the one or more light sources.

The light sources described herein may be configured to emit a plurality of colors or in other cases, may be configured to emit a single color.

Figure 5:
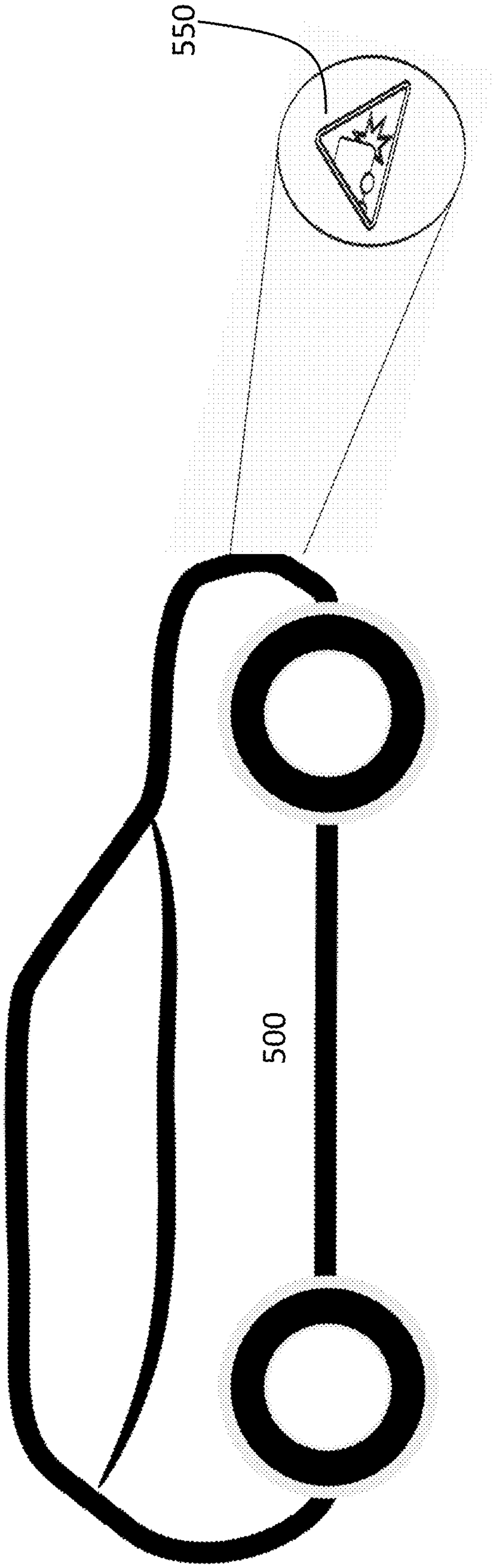
FIG. 5 illustrates example of vehicle projecting images according to aspects of the present disclosure.

The automotive lighting apparatus described herein are configured to be implemented in various vehicles and automobiles. In example, shown in FIG. 5, shows vehicle 500 that outputs a projected image 550 external to the vehicle 500. However, in other cases, the projected image 550 need not be external to the vehicle. That is, the projected image can be inside the vehicle.

Figure 6:
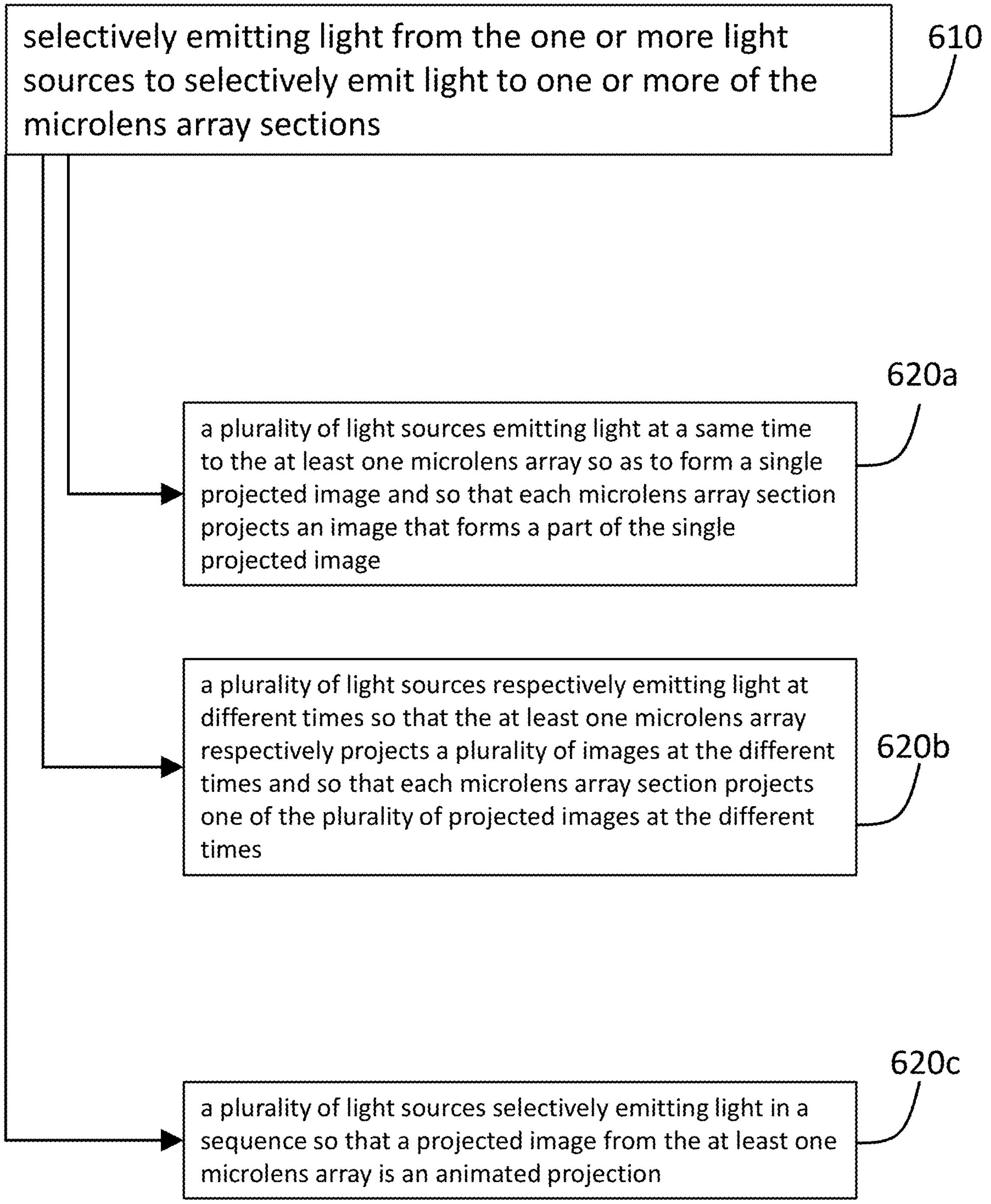
FIG. 6 illustrates a method of controlling an automotive lighting apparatus according to aspects of the present disclosure.

FIG. 6 shows a flow diagram a method 600 that can be implemented by automotive lighting apparatus described herein according to aspects of the present disclosure. That is, the method 600 may be implemented by an automotive lighting apparatus including a heatsink; a lighting module coupled to the heat sink, the lighting module including one or more light sources, a light source driver for driving the one or more light sources; at least one microlens array including a plurality of microlenses including a plurality of sections, wherein each microlens array section is configured to project an image using light from the one or more light sources; a collimating assembly arranged between the lighting module and the at least one microlens array including: one or more collimators corresponding respectively to the one or more light sources, wherein each of the one or more collimators is aligned in a light path from a corresponding one of the one or more light source and the at least one microlens array.

The method 600 includes at 610, selectively emitting light from the one or more light sources to selectively emit light to one or more of the microlens array sections.

The selectively emitting light at 610 can occur in a variety of ways. For example, at 620*a*, the selectively emitting light from the one or more light sources includes a plurality of light sources emitting light at a same time to the at least one microlens array so as to form a single projected image and so that each microlens array section projects an image that forms a part of the single projected image.

At 620*b*, the selectively emitting light from the one or more light sources includes a plurality light of sources respectively emitting light at different times so that the at least one microlens array respectively projects a plurality of images at the different times and so that each microlens array section projects one of the plurality of projected images at the different times.

At 620*c*, the selectively emitting light from the one or more light sources includes a plurality of light sources selectively emitting light in a sequence so that a projected image from the at least one microlens array is an animated projection.

While automotive lighting apparatuses have been described herein, other similar apparatuses can be realized with the same or similar configuration and components. That is, instead of automotive lighting apparatuses, automotive sensor apparatuses can be realized.

In one case, the automotive sensor apparatus can be realized with sensors instead of light sources. For example, in the context of at least the apparatus 100 of FIG. 1, the light sources 125 can also be sensors 125. The sensors 125 may be any type of sensor, including, for example, any suitable light sensor (e.g., photodiodes), IR sensors, radar sensors, LIDAR sensor. The sensors 125 may be a combination of sensors and light soruces (e.g., IR sensors, optical light sensors, and/or IR/VIS LEDs). The sensors can be configured to sense changes in EM radiation received, such as a change in light incident on the automotive apparatus induced by a user reflecting/scattering light entering the projection field.

EXAMPLE SECTION—GENERAL CLAIM SET

In the following some non-limiting examples are described, which relate to what is described herein and shown in the figures. The Examples may be combined with each other in any appropriates manner.

Example 1 is an automotive lighting apparatus including: a heatsink; a lighting module coupled to the heat sink, the lighting module comprising one or more light sources, a light source driver for driving the one or more light sources; at least one microlens array including a plurality of microlenses comprising a plurality of sections, wherein each microlens array section is configured to project an image using light from the one or more light sources; a collimating assembly arranged between the lighting module and the at least one microlens array comprising: one or more collimators corresponding respectively to the one or more light sources, wherein each of the one or more collimators is aligned in a light path from a corresponding one of the one or more light source and the at least one microlens array.

Example 2 is the subject matter of Example, wherein the one or more light sources may include a plurality of light sources, and wherein the one or more collimators may include a plurality of collimators, wherein each light source corresponds to one of the plurality of collimators and one of the microlens array sections.

Example 3 is the subject matter of Example 2, which may further include a controller configured to control operation of the one or more light sources, wherein the controller is configured to cause the each of the plurality of light sources to selectively emit light to one or more of the microlens array sections.

Example 4 is the subject matter of Example 3, wherein the is controller may be configured to cause the plurality of light sources to emit light at a same time to the at least one microlens array so as to form a single projected image, wherein each microlens array section projects an image that forms a part of the single projected image.

Example 5 is the subject matter of Example 3,
wherein the is controller may be configured to cause the plurality of light sources to respectively emit light at different times so that the at least one microlens array respectively projects a plurality of images at the different times, wherein each microlens array section projects one of the plurality of projected images at the different times.

Example 6 is the subject matter of Example 3,
wherein the controller may be configured to cause the one or more light sources to selectively emit light in a sequence so that projected image from the at least one microlens array is an animated projection, wherein each microlens array section projects an individual frame of the animated projection.

Example 7 is the subject matter of Example of any of Examples 3 to 6,
wherein the controller may be configured to cause the one or more light sources to selectively emit light in a sequence of variable brightness.

Example 8 is the subject matter of Example 3,
wherein the controller may be configured to cause the one or more light source to selectively emit light using pulse-width modulation (PWM) signal to control the one or more light sources.

Example 9 is the subject matter of Example 2,
wherein the plurality of light sources may be configured to emit a plurality of colors.

Example 10 is the subject matter of Example 9,
wherein each the plurality of light sources may be configured to emit a single color.

Example 11 is the subject matter of any of Examples 1 to 10,
wherein the one or more light sources may include one or more light-emitting diodes.

Example 12 is the subject matter of any of Examples 1 to 10,
wherein the one or more light sources may include one or more lasers.

Example 13 is the subject matter of any of Examples 1 to 10,
wherein the one or more light sources may include one or more vertical-cavity surface-emitting lasers (VCSELs).

Example 14 is the subject matter of any of Examples 1 to 13,
wherein the collimating assembly may include a housing, wherein the one or more collimators reside in the housing.

Example 15 is the subject matter of Example 14,
wherein the collimating assembly may include a mount or a slot, wherein the at least one microlens array may be coupled to the mount or may reside within the slot of the collimating assembly so that each light source of the lighting module aligns with a corresponding collimator and a corresponding microlens array section.

Example 16 is the subject matter of any of Examples 1 to 15,
wherein the at least one microlens array may be removably attachable to or removable from the collimating assembly.

Example 17 is the subject matter of any of Examples 1 to 16,
wherein the lighting module may include a printed circuit board (PCB), and wherein the one or more light sources are disposed on a first side of the PCB.

Example 18 is the subject matter of Example 17,
wherein the light source driver and/or the controller may be disposed on the first side of the PCB.

Example 19 is the subject matter of Example 17 or 18,
wherein the collimating assembly may be coupled to the first side of the PCB.

Example 20 is the subject matter of Example 1,
wherein the light sources may be individually addressable in response to communication to the light sources.

Example 21 is the subject matter of Example 20,
wherein the communications to the light sources may originate from a source external to the automotive lighting apparatus.

Example 1A is a method for operating an automotive lighting apparatus that includes: a heatsink; a lighting module coupled to the heat sink, the lighting module comprising one or more light sources, a light source driver for driving the one or more light sources; at least one microlens array comprising a plurality of microlenses comprising a plurality of sections, wherein each microlens array section is configured to project an image using light from the one or more light sources; a collimating assembly arranged between the lighting module and the at least one microlens array including one or more collimators corresponding respectively to the one or more light sources, wherein each of the one or more collimators is aligned in a light path from a corresponding one of the one or more light source and the at least one microlens array,
wherein the method includes:
selectively emitting light from the one or more light sources to selectively emit light to one or more of the microlens array sections.

Example 2A is the subject matter of Example 1A,
wherein the one or more light sources may include a plurality of light sources, and wherein the one or more collimators comprise a plurality of collimators, and
wherein each light source corresponds to one of the plurality of collimators and one of the microlens array sections.

Example 3A is the subject matter of Example 2A,
wherein selectively emitting light plurality of light sources may include the plurality of light sources emitting light at a same time to the at least one microlens array so as to form a single projected image and so that each microlens array section projects an image that forms a part of the single projected image.

Example 4A is the subject matter of Example 2A,
wherein selectively emitting light from the plurality of light sources comprises the plurality of light sources respectively emitting light at different times so that the at least one microlens array respectively projects a plurality of images at the different times and so that each microlens array section projects one of the plurality of projected images at the different times.

Example 5A is the subject matter of Example 2A,
wherein selectively emitting light from the plurality of light sources may include the plurality of light sources selectively emitting light in a sequence so that a projected image from the at least one microlens array is an animated projection.

Example 6A is the subject matter of any of Examples 2A to 5A,
wherein selectively emitting light from the plurality of light sources may include the plurality of light selectively emitting light in a sequence of variable brightness.

Example 7A is the subject matter of Example 2A,
wherein the plurality of light sources may be configured to emit a plurality of colors.

Example 8A is the subject matter of Example 7A, wherein each the plurality of light sources may be configured to emit a single color.

Example 9A is the subject matter of any of Example 1A to 8A,
wherein the one or more light sources comprise one or more light-emitting diodes.

Example 10A is the subject matter of any of Examples 1A to 8A,
wherein the one or more light sources may include one or more lasers.

Example 11A is the subject matter of any of Examples 1A to 8A,
wherein the one or more light sources may include one or more vertical-cavity surface-emitting lasers (VCSELs).

Example 1B is an automotive apparatus including: a heatsink; a module coupled to the heat sink, the module including one or more light/radiation sources and/or one or more sensors, at least one driver for driving the one or more light/radiation sources and/or sensors; at least one microlens array comprising a plurality of microlenses comprising a plurality of sections, wherein each microlens array section can be configured to project an image or pattern using light/radiation from the one or more light/radiation sources; a collimating assembly arranged between the lighting module and the at least one microlens array including: one or more collimators corresponding respectively to the one or more light/radiation sources, wherein each of the one or more collimators is aligned in a path from a corresponding one of the one or more light/radiation source and the at least one microlens array.

The word "exemplary" is used herein to mean "serving as an example, instance, or illustration." Any example or design described herein as "exemplary" is not necessarily to be construed as preferred or advantageous over other examples or designs.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The term "connected" or "coupled" can be understood in the sense of a (e.g. mechanical, optical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

Such electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components. As another example, circuitry or similar term can be implemented in hardware such as application specific integrated circuit (ASIC), programmable gate array (PGA), discrete digital circuits, etc.) or in a combination of hardware and software (e.g., a software model executed by a corresponding processor).

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

While the above descriptions and connected figures may depict device components as separate elements, skilled persons will appreciate the various possibilities to combine or integrate discrete features, functions into a single element. Such may include combining two or more components into a single component. Conversely, skilled persons will recognize the possibility to separate a single element into two or more discrete elements, such as splitting a single component into two or more separate components.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

Reference Numeral List automotive lighting apparatus 100
heat sink 110
lighting module 120
circuit board 122
light source driver circuitry 124
light source(s)/sensor(s) 125
controllers or processors 126
collimating assembly 130
receptacle(s) 133
microlens array 140
automotive lighting apparatus 300
circuit board 322
light sources 325
micro lens array 340
receptabcles 333
collimators 335
microlens array receptacle 338
microlens array 340
collimating assembly cover 342
automotive lighting apparatus 400
heat sink 410
lighting module 420
circuit board 422
light source driver 424
light sources 425
controller 426
collimating assembly 430
microlens arrays 440
microlens array 440
projected images 450*a-e*
sub-image 451
sub-image 452
vehicle 500
projected image 550
method 600
method steps 610, 620*a-c*

What is claimed is:

1. An automotive lighting apparatus comprising:

a heatsink;

a lighting module coupled to the heat sink, the lighting module comprising one or more light sources, a light source driver for driving the one or more light sources, and one or more light sensors corresponding to the one or more light sources;

at least one microlens array comprising a plurality of microlenses, the at least one microlens array comprising a plurality of microlens array sections, wherein each microlens array section is configured to project an image using light from the one or more light sources;

a collimating assembly arranged between the lighting module and the at least one microlens array comprising: one or more collimators corresponding respectively to the one or more light sources, wherein each of the one or more collimators is aligned in a light path from a corresponding one of the one or more light source and the at least one microlens array, wherein the one or more light sources comprise a plurality of light sources, wherein the one or more light sensors comprise a plurality of light sensors, and wherein the one or more collimators comprise a plurality of collimators, wherein each light source corresponds to one of the plurality of collimators and one of the plurality of microlens array sections, wherein the collimating assembly comprises a housing coupled to the lighting module, the housing including a first receptacle or slot configured to receive the one or more collimators in a side loaded manner and a second receptacle or slot configured to receive the at least one microlens array in a side loaded manner so that each light source of the lighting module aligns with a corresponding collimator and a corresponding microlens array section.

2. The automotive lighting apparatus of claim 1, further comprising:

a controller configured to control operation of the one or more light sources, wherein the controller is configured to cause the each of the plurality of light sources to selectively emit light to one or more of the microlens array sections.

3. The automotive lighting apparatus of claim 2, wherein the controller is configured to cause the plurality of light sources to emit light at a same time to the at least one microlens array so as to form a single projected image, wherein each microlens array section projects an image that forms a part of the single projected image.

4. The automotive lighting apparatus of claim 2, wherein the controller is configured to cause the plurality of light sources to respectively emit light at different times so that the at least one microlens array respectively projects a plurality of images at the different times, wherein each microlens array section projects one of the plurality of projected images at the different times.

5. The automotive lighting apparatus of claim 2, wherein the controller is configured to cause the one or more light sources to selectively emit light in a sequence so that projected image from the at least one microlens array is an animated projection, wherein each microlens array section projects an individual frame of the animated projection.

6. The automotive lighting apparatus of claim 2, wherein the controller is configured to cause the one or more light sources to selectively emit light in a sequence of variable brightness.

7. The automotive lighting apparatus of claim 2, wherein the controller is configured to cause the one or more light source to selectively emit light using pulse-width modulation (PWM) signal to control the one or more light sources.

8. The automotive lighting apparatus of claim 1, wherein the plurality of light sources is configured to emit a plurality of colors.

9. The automotive lighting apparatus of claim 8, wherein each the plurality of light sources is configured to emit a single color.

10. The automotive lighting apparatus of claim 1, wherein the one or more light sources comprise one or more light-emitting diodes.

11. The automotive lighting apparatus of claim 1, wherein the one or more light sources comprise one or more lasers or vertical-cavity surface-emitting lasers (VCSELs).

12. The automotive lighting apparatus of claim 1, wherein the one or more collimators are insertable in the first receptacle or slot of the housing so as to be removably couplable to the housing.

13. The automotive lighting apparatus of claim 1, wherein the at least one microlens array is insertable in the second receptacle or slot of the housing so as to be removably couplable to the housing and wherein a plate-like structure or member comprises the plurality of collimators.

14. The automotive lighting apparatus of claim 1, wherein the light sources and light sensors are combined.

15. The automotive lighting apparatus of claim 1, wherein the lights sensors are configured to sense changes in EM radiation received, such as a change in light incident on the automotive lighting apparatus induced by a user reflecting/scattering light entering a projection field of the light sources.

16. A method for operating an automotive lighting apparatus comprising:

a heatsink;

a lighting module coupled to the heat sink, the lighting module comprising one or more light sources, a light source driver for driving the one or more light sources, and one or more light sensors corresponding to the one or more light sources;

at least one microlens array comprising a plurality of microlenses, the at least one microlens array comprising a plurality of microlens array sections, wherein each microlens array section is configured to project an image using light from the one or more light sources;

a collimating assembly arranged between the lighting module and the at least one microlens array comprising: one or more collimators corresponding respectively to the one or more light sources, wherein each of the one or more collimators is aligned in a light path from a corresponding one of the one or more light source and the at least one microlens array, wherein the one or more light sources comprise a plurality of light sources, wherein the one or more light sensors comprise a plurality of light sensors, and wherein the one or more collimators comprise a plurality of collimators, wherein each light source corresponds to one of the plurality of collimators and one of the plurality of microlens array sections, wherein the collimating assembly comprises a housing coupled to the lighting module, the housing including a first receptacle or slot configured to receive the one or more collimators in a side loaded manner and a second receptacle or slot configured to receive the at least one microlens array in a side loaded manner so that each light source of the lighting module aligns with a corresponding collimator and a corresponding microlens array section, wherein the method comprises:

selectively emitting light from the one or more light sources to selectively emit light to one or more of the microlens array sections.

17. The method of claim 16, wherein the one or more light sources comprise a plurality of light sources, and wherein the one or more collimators comprise a plurality of collimators, wherein each light source corresponds to one of the plurality of collimators and one of the microlens array sections.

18. The method of claim 17, wherein selectively emitting light from the plurality of light sources comprises the plurality of light sources emitting light at a same time to the at least one microlens array so as to form a single projected image and so that each microlens array section projects an image that forms a part of the single projected image.

19. The method of claim 17, wherein selectively emitting light from the plurality of light sources comprises the plurality of light sources respectively emitting light at different times so that the at least one microlens array respectively projects a plurality of images at the different times and so that each microlens array section projects one of the plurality of projected images at the different times.

20. The method of claim 17, wherein selectively emitting light from the plurality of light sources comprises the plurality of light sources selectively emitting light in a sequence so that a projected image from the at least one microlens array is an animated projection.

* * * * *